(12) United States Patent
Samat et al.

(10) Patent No.: US 11,622,043 B1
(45) Date of Patent: *Apr. 4, 2023

(54) APPARATUSES AND METHODS INVOLVING DATA-COMMUNICATIONS VIRTUAL ASSISTANCE

(71) Applicant: 8×8, Inc., Campbell, CA (US)

(72) Inventors: Arunim Samat, Campbell, CA (US); Soumyadeb Mitra, Campbell, CA (US); Vijai Gandikota, Campbell, CA (US); Manu Mukerji, Campbell, CA (US); Solomon Fung, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 16/822,718

(22) Filed: Mar. 18, 2020

Related U.S. Application Data

(60) Provisional application No. 62/820,153, filed on Mar. 18, 2019.

(51) Int. Cl.
*H04M 3/00* (2006.01)
*H04M 3/523* (2006.01)
(Continued)

(52) U.S. Cl.
CPC ....... *H04M 3/5235* (2013.01); *G10L 15/1815* (2013.01); *H04M 3/4365* (2013.01);
(Continued)

(58) Field of Classification Search
CPC ............ H04M 3/5233; H04M 3/5235; H04M 3/5175; H04M 3/5237; H04M 3/5191; H04M 3/4365; G10L 15/1815
See application file for complete search history.

(56) References Cited

U.S. PATENT DOCUMENTS 6,061,433 A 5/2000 Polcyn et al.
7,065,188 B1 6/2006 Mei et al.
(Continued)

OTHER PUBLICATIONS

The Examiner is respectfully referred to concurrently-filed patent prosecution of the common Applicant, U.S. Appl. No. 16/822,760; U.S. Appl. No. 16/822,760; and U.S. Appl. No. 16/822,760.

(Continued)

*Primary Examiner* — Rasha S Al Aubaidi
(74) *Attorney, Agent, or Firm* — Crawford Maunu PLLC

(57) ABSTRACT

Apparatuses and methods concerning providing a data-communications virtual assistant are disclosed. As an example, one apparatus includes a data-communications server. The data communications server is configured to process user-data-communication between a client station and another client station participating in data-communications via the data-communications server, where each client station is associated with one client entity. The server is also configured to identify a context for each user-data-communication between the client station and the other client station, where the context corresponds to at least one communications-specific characteristic associated with the user-data-communication. The server is further configured to apply call routing based on the identified context.

20 Claims, 4 Drawing Sheets

(51) Int. Cl.
  *H04M 3/436* (2006.01)
  *H04M 3/51* (2006.01)
  *G10L 15/18* (2013.01)
  *G10L 15/08* (2006.01)

(52) U.S. Cl.
  CPC ....... *H04M 3/5175* (2013.01); *H04M 3/5191* (2013.01); *H04M 3/5237* (2013.01); *G10L 2015/088* (2013.01); *H04M 2203/2072* (2013.01)

(56) References Cited

U.S. PATENT DOCUMENTS

| | | |
|---|---|---|
| 7,269,598 B2 | 9/2007 | Marchisio |
| 7,369,653 B2 | 5/2008 | Dezonno et al. |
| 7,979,840 B2 | 7/2011 | Zhang et al. |
| 7,983,401 B1 | 7/2011 | Krinsky |
| 8,239,519 B2 | 8/2012 | Jang et al. |
| 8,316,347 B2 | 11/2012 | Arsanjani et al. |
| 8,332,813 B2 | 12/2012 | Arasanjani et al. |
| 8,411,842 B1 | 4/2013 | Wu et al. |
| 8,468,244 B2 | 6/2013 | Redlich |
| 8,739,111 B2 | 5/2014 | Allam et al. |
| 8,750,123 B1 | 6/2014 | Alisawi et al. |
| 8,874,755 B1 | 10/2014 | Deklich et al. |
| 9,077,746 B2 | 7/2015 | Chandrshekhar |
| 9,171,319 B2 | 10/2015 | Qu et al. |
| 9,213,564 B1 | 12/2015 | Klein et al. |
| 9,392,049 B2 | 7/2016 | Ennis et al. |
| 9,542,832 B1 | 1/2017 | Fu et al. |
| 9,552,512 B2 | 1/2017 | Guo et al. |
| 9,717,017 B2 | 7/2017 | Backholm et al. |
| 10,021,590 B2 | 7/2018 | Backholm et al. |
| 10,027,803 B2 | 7/2018 | Krinsky et al. |
| 10,096,063 B2 | 10/2018 | Dahlwadkar |
| 10,282,791 B2 | 5/2019 | O'Neil |
| 10,394,975 B2 | 8/2019 | Kim et al. |
| 10,433,243 B2 | 10/2019 | Lopes et al. |
| 10,573,312 B1 | 2/2020 | Thomson |
| 10,666,799 B2 | 5/2020 | Kazerani et al. |
| 10,735,592 B1 | 8/2020 | Liu et al. |
| 10,944,800 B1 | 3/2021 | Arsanjani et al. |
| 10,949,619 B1 | 3/2021 | Arsanjani et al. |
| 11,025,488 B1 | 6/2021 | Arsanjani et al. |
| 2003/0187868 A1 | 10/2003 | Igarashi |
| 2004/0064517 A1 | 4/2004 | Uenoyama et al. |
| 2004/0122245 A1 | 6/2004 | Franks |
| 2005/0152511 A1 | 7/2005 | Stubley |
| 2007/0033078 A1 | 2/2007 | Mandalia et al. |
| 2008/0027784 A1 | 1/2008 | Ang et al. |
| 2008/0140348 A1 | 6/2008 | Frank |
| 2008/0140642 A1 | 6/2008 | Messing et al. |
| 2008/0214219 A1 | 9/2008 | Matsushima |
| 2008/0228296 A1 | 9/2008 | Eilam et al. |
| 2009/0083768 A1 | 3/2009 | Hatalkar et al. |
| 2009/0254572 A1 | 10/2009 | Redlich et al. |
| 2009/0327172 A1 | 12/2009 | Liu et al. |
| 2010/0114684 A1 | 5/2010 | Neged |
| 2010/0226490 A1 | 9/2010 | Schultz et al. |
| 2010/0250497 A1 | 9/2010 | Redlich et al. |
| 2014/0012826 A1 | 1/2014 | Wisman et al. |
| 2014/0064072 A1 | 3/2014 | Ludwig |
| 2014/0064202 A1 | 3/2014 | Norstrom et al. |
| 2014/0120981 A1 | 5/2014 | King et al. |
| 2014/0244652 A1 | 8/2014 | O'Neil |
| 2015/0242513 A1 | 8/2015 | Sanghavi et al. |
| 2015/0243155 A1 | 8/2015 | Xiong et al. |
| 2015/0256676 A1 | 9/2015 | Famous |
| 2015/0294377 A1 | 10/2015 | Chow |
| 2015/0363563 A1 | 12/2015 | Hallwachs |
| 2016/0036869 A1 | 2/2016 | Logan et al. |
| 2016/0080428 A1 | 3/2016 | Fan et al. |
| 2016/0080570 A1 * | 3/2016 | O'Connor ........... H04M 3/5133 379/265.09 |
| 2016/0100053 A1 | 4/2016 | Wong et al. |
| 2016/0188960 A1 | 6/2016 | Guo et al. |
| 2016/0227431 A1 | 8/2016 | Misawi |
| 2016/0350674 A1 | 12/2016 | Midboe |
| 2016/0360039 A1 | 12/2016 | Sanghavi et al. |
| 2016/0364368 A1 | 12/2016 | Chen et al. |
| 2016/0364488 A1 | 12/2016 | Shen et al. |
| 2017/0104876 A1 | 4/2017 | Hibbard et al. |
| 2017/0154376 A1 | 6/2017 | Mirchandani et al. |
| 2017/0236148 A1 | 8/2017 | James et al. |
| 2017/0257303 A1 | 9/2017 | Boyapalle et al. |
| 2017/0262164 A1 | 9/2017 | Jain et al. |
| 2017/0264743 A1 | 9/2017 | Kocan |
| 2018/0032576 A1 | 2/2018 | Romero |
| 2018/0041378 A1 | 2/2018 | Yan et al. |
| 2018/0047072 A1 | 2/2018 | Chow |
| 2018/0054523 A1 | 2/2018 | Zhang et al. |
| 2018/0054524 A1 | 2/2018 | Dahan et al. |
| 2018/0176174 A1 | 6/2018 | Sherman et al. |
| 2018/0176281 A1 | 6/2018 | Arunachalam et al. |
| 2018/0184140 A1 | 6/2018 | Danker et al. |
| 2018/0184171 A1 | 6/2018 | Danker et al. |
| 2018/0309708 A1 | 10/2018 | Potvin |
| 2018/0324041 A1 | 11/2018 | Deklich et al. |
| 2019/0012251 A1 | 1/2019 | Khosrowpour et al. |
| 2019/0042988 A1 | 2/2019 | Brown et al. |
| 2019/0057470 A1 | 2/2019 | Shirasaka et al. |
| 2019/0150203 A1 | 5/2019 | Maguire et al. |
| 2019/0243836 A1 | 8/2019 | Nanda et al. |
| 2019/0253520 A1 | 8/2019 | Maharana et al. |
| 2019/0327130 A1 | 10/2019 | Huang et al. |
| 2019/0342718 A1 | 11/2019 | Pylappan et al. |
| 2019/0349426 A1 | 11/2019 | Smith et al. |
| 2020/0065425 A1 | 2/2020 | Menguy et al. |
| 2020/0092293 A1 | 3/2020 | Liu et al. |
| 2020/0133629 A1 | 4/2020 | Pratt et al. |

OTHER PUBLICATIONS

The Examiner is respectfully referred to concurrent patent prosecution of the common Applicant, U.S. Appl. No. 17/543,232; U.S. Appl. No. 17/543,232; and U.S. Appl. No. 17/543,232.

* cited by examiner

APPARATUSES AND METHODS INVOLVING DATA-COMMUNICATIONS VIRTUAL ASSISTANCE

OVERVIEW

Various example embodiments are directed to apparatuses, systems, methods of use, methods of making, or materials, such as those described in the claims, description or figures herein, all of which form part of this patent document.

Various embodiments are directed to addressing challenges relating to aggregating information from a plurality of data-communications systems to provide a data-communications virtual assistant. Accordingly, various embodiments are directed to a variety of apparatuses, methods, components and/or related systems comprising or related to a data communications virtual assistant, including a data communications server configured and arranged to process user-data communications between a client station and another station participating in data communications via the data communications server, where the client station is associated with one of the client entities, and identifies a context (e.g., criticality and sentiment) for each respective user-data communication between the client station and the participating station, where the context corresponds to at least one communications-specific characteristic associated with the user-data communications. In such example embodiments, the data-communications server may apply call routing based on the identified topic context (e.g., criticality and sentiment). In various embodiments, the data-communications server may identify critical calls among a plurality of data-communications, and/or identify a sentiment for each communication among the plurality of data-communications. The data-communications server may identify an importance for each respective individual (e.g., caller) involved in the data-communication, and route the call based on the identified importance of the individual. Moreover, the data-communications server may be configured and arranged to route communications based on a determined topic and criticality.

Certain embodiments involve apparatuses, methods, systems, circuitries, and the like as exemplified in the following discussion, figures, and/or claims.

BRIEF DESCRIPTION OF FIGURES

Various example embodiments may be more completely understood in consideration of the following detailed description in connection with the accompanying drawings, in which.

Figure 1:
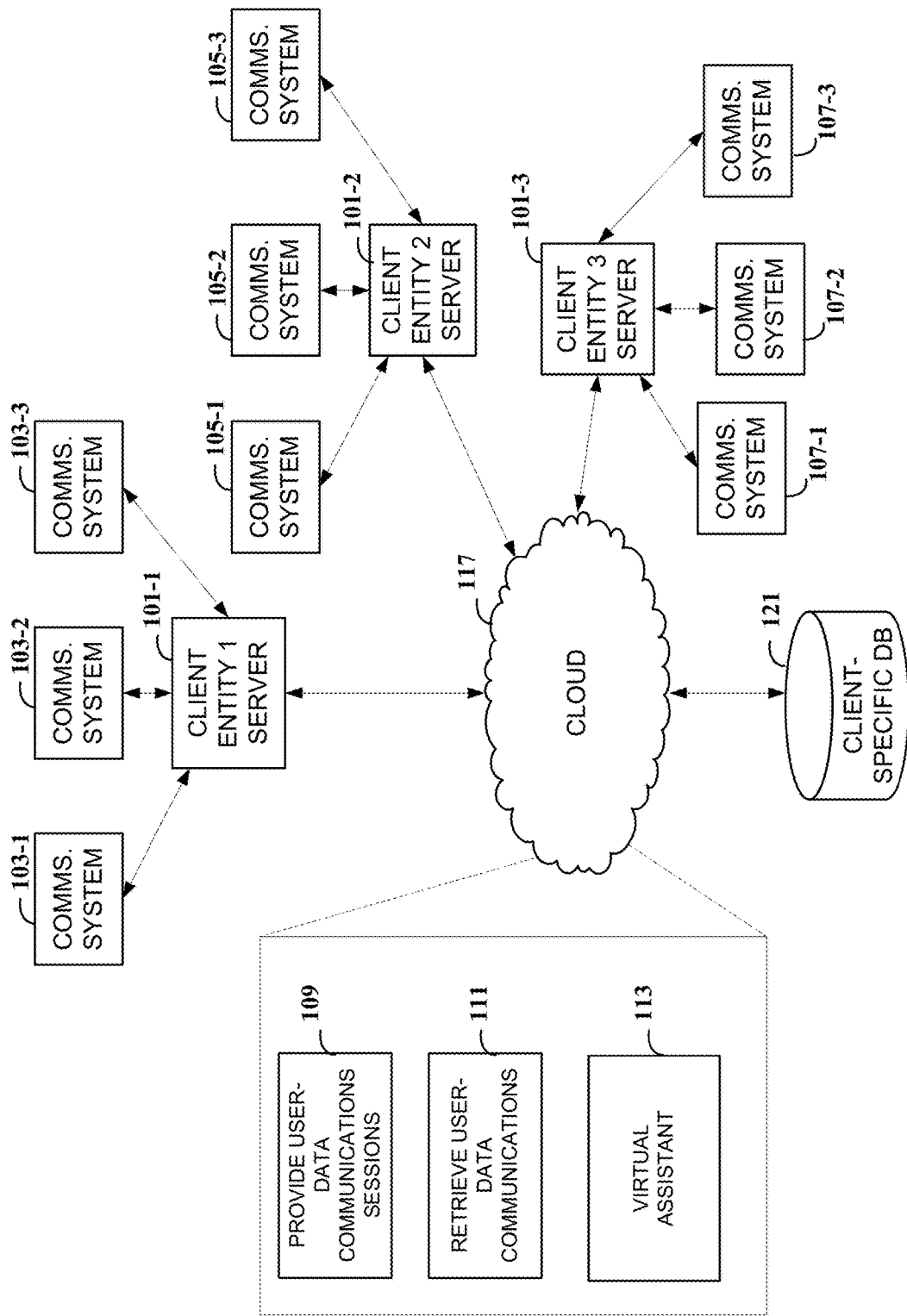
FIG. 1 illustrates a block diagram of an example system for a data-communications virtual assistant, consistent with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving providing a data-communications virtual assistant. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

Embodiments are directed toward methods and/or apparatuses for use in communications systems employing a data-communications server operated by a communications provider, where the data-communications server is on the data-communications provider side, to provide data-communications services to a multitude of client entities. For instance, the data-communications server may provide data-communications sessions each involving a client-specific endpoint device and another participating endpoint device, where the client-specific endpoint device is associated with a client-entity among the plurality of remotely situated client entities. In such contexts, the data-communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues. Each such data-communications session may include transmission and receipt of data-communications between at least two endpoint devices, as hosted (e.g., provided) by the data-communications server.

Identifying critical communications (including calls), the sentiment of a communication, and identifying "caller" importance are all relevant to providing a data-communications virtual assistant. Examples for call routing based on topic criticality and sentiment include a spreadsheet and a unique representation of the entity (e.g., as may involve JavaScript Object Notation (JSON)) and involve a representation denoted PersonCallFlow with sub entities for rules and topic priorities based on context. The context may be built by taking into account caller priority, criticality, sentiment and caller background (e.g., company, industry, history, etc.).

Difficulty may arise with regards to incorporating additional data (e.g., salesforce data) and identifying topics and cross-training to use that data for calls and for call routing. Additionally, implementations may be directed toward pulling a call back to voicemail (internal and external numbers) for various subsequent handling processes.

In various example embodiments, providing a data-communications virtual assistant allows users to search for relevant slots for a meeting and/or an appointment when a calendar slot is busy. Additionally, providing a data-communications virtual assistant allows users to utilize the expertise and skills from a data-communications room recommender or predictor to route calls or prioritize whom the call should be sent to. The virtual assistant described herein may identify (e.g., figure out) if an alternate caller is available or not, and may learn from the experience of the caller answering the call.

In some example embodiments, the virtual assistant described herein may determine whether the call (e.g., communication) resolution was made, what was the action (if there was one), if there was a follow-up call, etc. For instance, the virtual assistant may launch a postcall analysis engine, which disregards agent feedback and analyzes the call (e.g., data-communication) independent of agent bias to determine if a resolution was made or not. Additionally, the virtual assistant can inform the original calling person if the query of the caller was resolved or not.

In accordance with examples of the present disclosure, systems, methods, and/or apparatuses for providing a data-communications virtual assistant may automatically generate the rules (e.g., routing and notification rules) based on learning of patterns of answering calls. As one example, a method for providing a data-communications virtual assistant may proceed as follows:

1. Call forwarded to targeted VOD-related central processing unit (CPU) terminal ("VOD" referring to a virtual office desktop)
2. No pickup
3. Forwarded to script8
4. CreateSession
    4a: Session state (caller, phone #, session_id saved in DB ("database"))
5. Forwarded to Dialogflow Agent via gateway
    5a: Booking Appointment Intent (interfaces with calendar API)
    5b: Fallback Routing Intent. Calls into Topic & Criticality ML APIs & Routing Table
    5c: Session DB updated with matched intent, routing recipient
6. GetSession—Script8 gets session state from DB
    6a: To decide if terminate call OR route call
7. Call is forwarded (in case routing intent matched)
8. VoiceMail—If 7 doesn't pickup, voicemail captured in script8

In accordance with examples of the present disclosure, systems, methods, and/or apparatuses for providing a data-communications virtual assistant include a communications system involving a data-communications server and a client-managed server. In such example embodiments, the data-communications server is configured and arranged to provide user-data-communications sessions, each involving a client-specific endpoint device and another participating endpoint device, where the client-specific endpoint device is associated with a client-entity among a plurality of remotely-situated client entities each respectively configured and arranged to interface with the data-communications server. The data-communications server retrieves from a plurality of disparate interconnected data-communications systems, user-data-communications between the client-specific endpoint device and the other participating endpoint device during a first time period, where the data communications systems each provide at least one data-communications service to the client entity on a subscription basis. The data-communications server further identifies a context (e.g., criticality and sentiment) for each respective user-data-communication between the client station and the participating station, where the context information corresponds to at least one communications-specific characteristic associated with the user-data-communications, and applies call routing based on the identified topic context (e.g., criticality and sentiment).

As an illustration, the data-communications server may be configured and arranged to identify critical calls among the plurality of data-communications, identify a sentiment for each communication among the plurality of data-communications, identify an importance for each respective individual (e.g., caller) involved in the data-communication, and route communications based on topic criticality, sentiment, and/or importance. In some example embodiments, the data-communications server may generate a list of a unique JSON representation of each respective entity: PersonCallFlow with sub entities for Rules and Topic priorities based on context, and build a context by taking into account caller priority, criticality, sentiment and caller background (e.g., company, industry, history etc.). In some example embodiments, the data-communications server may apply call routing based on caller identification (caller id) disambiguation (e.g., name, social profiles, etc.) in response to an indication that the person calling is not recognized by the data-communications server. Additionally, the data-communications server may schedule meetings and/or appointments based on the identified context information and using aggregated information from a plurality of data-communications services, as well as reschedule meetings and/or appointments based on the identified context information and using aggregated information from the plurality of data-communications services. Additionally and/or alternatively, the data communications server may provide extra information for upcoming meetings, appointments, and/or communications based on the identified context information and using aggregated information from the plurality of data-communications services.

The embodiments and specific applications discussed herein may be implemented in connection with one or more of the above-described aspects, embodiments and implementations, as well as with those shown in the figures, which are fully incorporated herein by reference.

In various example embodiments, providing a data-communications virtual assistant includes curating a dataset of various emotions (e.g., happy, sad, etc.) for a plurality of (e.g., 1000+) audio clips randomly taken from customer service data, and trimming the clips to short (e.g., 30 second) sections after agents ask various questions such as "what are you calling about?" The virtual assistant described herein may use a vggish network (referring to a Visual Geometry Group (VGG) or similar network) with the prediction layer trimmed off to get the final embedding layer, and generated embeddings for all the 500 audio clips. The virtual assistant may then train a logistic regression model with the vggish embeddings, and test the model on a test dataset (200 samples with even distribution of the labels). Results yield around 65% accuracy with ~70% precision. For more information regarding such VGG-like software modeling/network (or vggish), reference may be made to Google-provided resources such as at https://research.google.com/audioset/download.html (explaining that VGG-like model may be used to generate the 128-dimensional features (VGGish) as available in the TensorFlow models Github repository, along with supporting code for audio feature generation, embedding post-processing, and demonstrations of the model in inference and training modes). See also YouTube-8M starter code for how to train models on the released features from both AudioSet as well as YouTube-8M, and YouTube-8M GitHub repository.

Turning now to the figures, FIG. 1 illustrates a block diagram of an example system for providing a data-communications virtual assistant, consistent with the present disclosure. Data-communications services may be provided for a plurality of client entities, such as via a data-center communications server. Each client entity may provide the data-communications services to various endpoint devices, as may be implemented in a distributed computing environment. For instance, as illustrated in FIG. 1, a data-center communications server may host via cloud 117. A plurality of client entities may access the data-center communications server via the cloud 117, such as by a respective client entity server (e.g., client entity 1 server 101-1, client entity 2 server 101-2, and client entity 3 server 101-3).

Each of the respective client entities may be connected in one or more data networks as discussed further herein. Moreover, each of the respective client entity servers 101-1, 101-2, and 101-3 may be communicatively coupled to a plurality of communications systems. For example, client entity 1 server 101-1 may be communicatively coupled to communications systems 103-1, 103-2, and 103-3. Similarly, client entity 2 server 101-2 may be communicatively coupled to communications systems 105-1, 105-2, and 105-3. Further, client entity 3 server 101-3 may be communicatively coupled to communications systems 107-1, 107-2, and 107-3.

Although not illustrated in FIG. 1, each of the client entity servers may be communicatively coupled to a number of endpoint devices. The endpoint devices may include data-communications-enabled devices (e.g., IP phones, smart phones, tablets, and/or desktop computers with appropriate data-communications software applications) and/or non-data-communications endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data-communications server. Registered devices for each client account may be listed in a respective account settings file (not shown) stored by a data-center communications server.

The system illustrated in FIG. 1 may further include one or more processing circuits (not shown) configured to implement client-specific control engines, which are configured to adjust the data-communications provided for each client account according to a respective set of control directives. For instance, the client-specific control engines may adjust a manner in which endpoint devices are controlled, and/or a manner of routing of a data communications for a client account, by accessing client-specific sets of control data stored in at least one client-specific database 121.

The server-based communications system illustrated in FIG. 1 may facilitate providing a data-communications virtual assistant, consistent with the present disclosure. In various exemplary embodiments, a data-communications virtual assistant may be provided by a data-center communications server. Additionally and/or alternatively, a data-communications virtual assistant may be provided by a client-managed server. In either situation, at 109, user-data communications sessions each involving a client-specific endpoint device and another participating endpoint device may be provided, where the client-specific endpoint device is associated with a client-entity among a plurality of remotely-situated client entities each respectively configured and arranged to interface with the data-communications server. For instance, the data-communications server may provide to each of client entity 1, client entity 2, and client entity 3, data-communications services as described herein. Subsequently, at 111, user-data communications between the client entity and the other party may be retrieved from a plurality of interconnected data-communications systems for a first time period. A context may be determined for each respective user-data communication between the client entity and the other party during the first time period, as described herein. The identification of the context of communications during the first time period may assist with the development of the client-specific database 121, and enable machine learning to assign a context to subsequent user-data communications. As such, a plurality of user-data communications between the client entity and the other party may be aggregated and, for example, utilized to characterize and/or route further data communications.

At 113, a data-communications virtual assistant may be provided. The data-communications virtual assistant may be provided based on the aggregated context information, and may apply call routing based on the identified topic context (e.g., as may relate to criticality and sentiment). The virtual assistant 113 may include or otherwise utilize communications circuitry for communicating with respective stations including client stations associated with respective client entities (e.g., utilizing the client entity servers and/or communications systems as shown). The virtual assistant 113 may also include or otherwise utilize a data-communications server, including circuitry, which operates with the communications circuitry to process user-data-communication between the respective stations, including one of the client stations and another one of the client stations participating in data-communications via the data-communications server. The virtual assistant 113 may further identify context data for each user-data-communication with the one of the client stations, the context data including data indicative of at least one communications-specific characteristic associated with the user-data-communication. The virtual assistant 113 aggregates the identified context data for the one of the client stations and applies call routing based on the aggregated context data, including routing communications from the one of the client stations to another one of the client stations.

As described herein, a context may represent an overall sentiment of a relationship between at least two parties. The context (and related sentiment) may be identified based on a number of factors, including keyword, phrase, and/or tone, and may be identified from a single user-data communication between the parties and/or from an aggregate of user-data communications between the parties. In embodiments where the context is determined from an aggregate of user-data communications, projections and/or predictions may be made as to the likely future context between the parties. Additionally and/or alternatively, the context may be displayed for each disparate data communications system, allowing the viewer to assess the context between the two parties in differing communications platforms.

Figure 2:
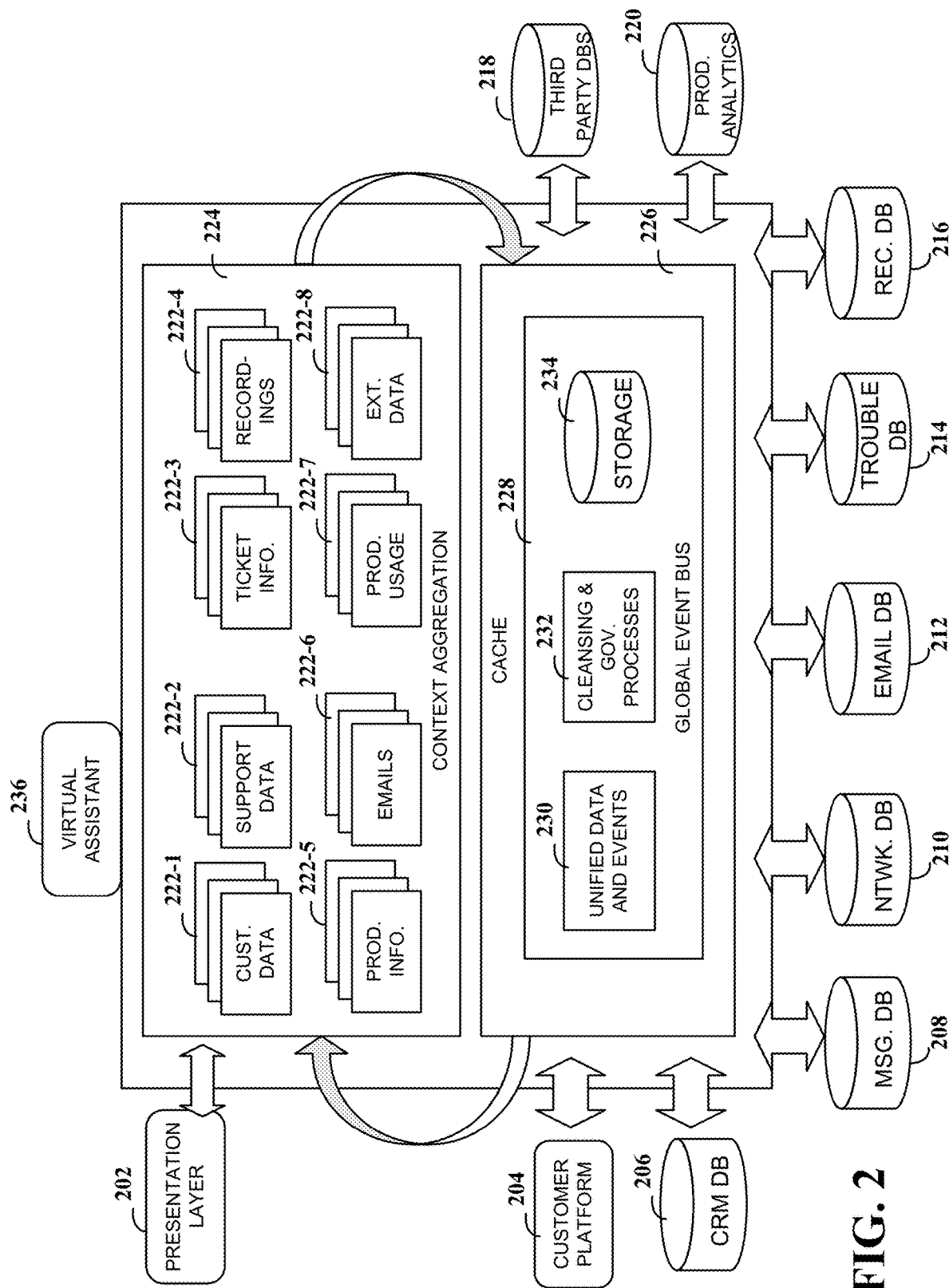
FIG. 2 illustrates a block diagram of an example system of intelligence for a data-communications virtual assistant, consistent with the present disclosure.

FIG. 2 illustrates a block diagram of an example system of intelligence for generating a data-communications virtual assistant, consistent with the present disclosure. The system of intelligence illustrated in FIG. 2 may be implemented by a data-center communications server hosted by a communications service provider, and/or by a client managed server hosted by a client of the communications service provider.

As discussed with regards to FIG. 1, each client entity may be associated with a plurality of interconnected data communications systems. For instance, each client entity may be associated with a customer relationship management (CRM) system, an email communication system, a product sales system, a text-based communications system (e.g., chat), a technological support system, and/or a data monitoring system. Examples are not so limited, and each client entity may be associated with additional and/or different communications systems beyond those listed. Additionally, the client entity and/or the communications service provider may be communicatively coupled to external (e.g., third party) systems and/or databases.

Referring to FIG. 2, a data cache 226 may store real-time information about all interactions involving the client entity (including the other party). For instance, a global event bus 228, stored in cache 226, may identify and record each interaction and/or event involving the client entity. A unified data and events circuit 230 may store the various data and events involving the client entity, such as emails sent and received, phone calls placed and received, chat messages, etc. A cleansing and governance processes circuit 232 may process the unified data and events as appropriate based on the content of the data. For instance, different encryption and/or data handling processes may be implemented for data and events including health data and/or financial data. A storage circuit 234 may store the various events, information regarding cleansing and governance processes, and other information.

In response to an event occurrence, such as transmission or receipt of a user-data communication, the cache 226 may be updated. Particularly, the cache 226 may be updated to include an updated context based on the aggregated communications between the client entity and the other party. For instance, the cache 226 may be communicatively coupled to a plurality of databases, including a customer platform database 204, a CRM database 206, a messaging database 208, a networking or developmental operations database 210, an email database 212, a troubleshooting database 214, a recordings database 216, a product analytics and usage database 220, and third party databases 218, among others. Data and/or information pertaining to a particular user may be retrieved from each of these databases, and stored for context aggregation, such as by a context aggregation circuit 224. As an illustration, to determine a context between user 1 and entity 1, information pertaining to customer sales and billing for user 1 may be retrieved from the CRM database 206, service tickets may be retrieved from troubleshooting database 214, and transcripts of voice calls may be retrieved from the recordings database 216. Similarly, to determine a context between user 2 and entity 1, information pertaining to customer sales and billing for user 2 may be retrieved from the CRM database 206, service tickets may be retrieved from troubleshooting database 214, and transcripts of voice calls may be retrieved from the recordings database 216.

In various embodiments, data and/or information from each respective database may be stored in the context aggregation circuit 224. For instance, customer data 222-1 from the customer platform 204, support data 222-2 from the network database 210, message transcripts (not illustrated in FIG. 2) from the message database 208, product information 222-5 from the CRM database 206, and emails 222-6 from the email database 212 may be stored in the context aggregation circuit 224. Additionally, service ticket information 222-3 from the troubleshooting database 214, recordings and/or transcripts from the recordings database 216, product usage and analytics 222-7 from the product analytics database 220, and external data 222-8 from third party databases 218 may be stored in the context aggregation circuit 224.

Each time that an event occurs involving the client entity and the other party, the cache 226 and context aggregation circuit 224 may be updated. In various example embodiments, a presentation layer 202 may present the virtual assistant 236 in various formats. For example, circuitry configured and arranged to communicate with the system of intelligence illustrated in FIG. 2 (e.g., the cache 226 and the context aggregation circuit 224) may present a graphical user interface on a desktop computing device, mobile computing device, and/or tablet, which visually presents the context between the client entity and the other party. The presentation layer 202 may further facilitate the presentation of the virtual assistant 236, as identified with regards to FIG. 1.

Figure 3:
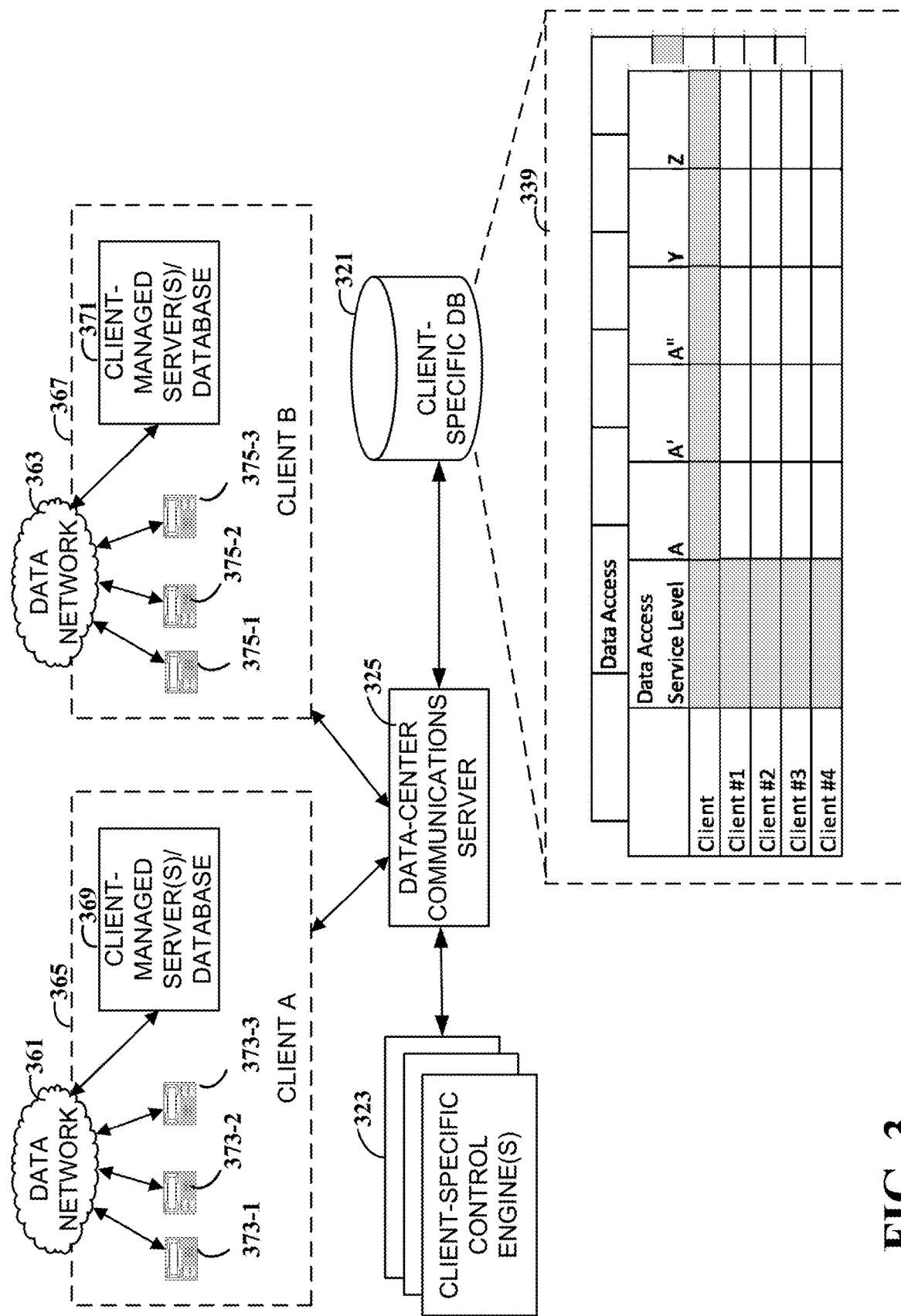
FIG. 3 illustrates a block diagram of an example data-communications system for a data-communications virtual assistant, consistent with the present disclosure.

FIG. 3 illustrates a block diagram of an example data-communications system for client-specific data-communications monitoring, consistent with the present disclosure. The system includes a data-center communications server 325 configured to provide data-communications for a plurality of endpoint devices 373-1, 373-2, 373-3, 375-1, 375-2, 375-3 connected in one or more data networks 361 and 363. The endpoint devices may include data-communications-enabled devices (e.g., IP phones, smart phones, tablets, and/or desktop computers with appropriate data-communications software applications) and/or non-data-communications endpoint devices (e.g., plain old telephone service (POTS) telephones and cellular-capable devices). Each endpoint device may be respectively associated with an account of a respective client. Endpoint devices may be associated with a particular client account by registering the endpoint device with a particular client account serviced by the data-communications server. Registered devices for each client account may be listed in a respective account settings file (not shown) stored by the data-center communications server 325. In this example, endpoint devices 373-1, 373-2, and 373-3 are associated with an account 365 for a first client A and endpoint devices 375-1, 375-2, and 375-3 are associated with an account 367 for a second client B.

The system includes one or more processing circuits configured to implement client-specific control engines 323, which may be configured to adjust the data-communications provided for each client account according to a respective set of control directives. For instance, the client-specific control engines 323 may adjust a manner in which endpoint devices 373-1, 373-2, 373-3, 375-1, 375-2, and 375-3 are controlled, and/or a manner of routing of a data-communications for a client account, by generating client-specific sets of control data to the data-center communications server 325. For example, the client-specific control engines 323 may generate client-specific sets of control data by processing the respective set of control directives for the account in response to communication event data or other data prompts received from the data-center communications server 325.

As previously described, client-specific control engines 323 may be used to facilitate control of endpoint devices associated with a client device. The control of the endpoint devices may be associated with a variety of virtual office features including, for example, data-communications services such as voice over Internet Protocol (VoIP) calls, audio and/or video conferencing, internet protocol private branch exchange (IP PBX) servers, packet switching, and traffic management as well as non-data communications services including, but not limited to, website hosting, remote data storage, remote computing services, virtual computing environments. One or more of such virtual office features may be provided, for example, by a cloud-computing network having one or more servers configurable to provide a data communications system for a plurality of clients.

Each respective client entity may have a client-managed server and/or database. For instance, client A 365 may be associated with a client-managed server or database 369, whereas client B 367 may be associated with a client managed server or database 371. The client-managed server may facilitate the routing of data-communications between the respective endpoint devices and the data-center communications server. Similarly, the client-managed servers may analyze, in some example embodiments, the sentiment and criticality of communications sent to and/or received by the respective endpoint devices, as discussed herein. In some example embodiments, each respective client entity may have a database storing client-specific preferences correlating different sentiment scores and criticality scores with different handling processes.

Additionally and/or alternatively, the data-center communications server 325 may be communicatively coupled with a client specific database 321, storing service level subscriptions 339 for each of a plurality of client entities. For example, the data-communications service provider may provide a plurality of different service levels for the clients. Each disparate service level may provide additional services and/or information to the client entity, relative to past communications handled and subsequent communications to be handled by the service provider. For example, Client A 365 and Client B 367 may be associated with a home improvement store and an adhesives manufacturer, respectively. Service level A, which can be offered to both Client A and Client B, may be associated with routing communications for Client A and Client B, and also providing information to the clients regarding customer purchase data. The purchase data may include information about how many products were purchased, when they were purchased, which products were associated with problems and/or an increased number of customer complaints, and the like. Similarly, a second service level (e.g., service level A') may include the services of the first service level (e.g., service level A) but also information on venue and regional demographics. For instance, Service level A', which may be offered to both Client A and Client B, may be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") may include the services of service level A' but also information on venue and relative pricing grouping. For instance, service level A", which can be offered to both Client A and Client B, can be associated with routing communications for Client A and Client B, providing information to the clients regarding customer purchase data, providing information about demographic populations, and information regarding relative prices which each demographic population may be willing to spend. Additional service levels (e.g., service level Y and service level Z illustrated in FIG. 2) may be specified. Each respective client entity (e.g., client #1 through client #4) may have a specified level of data service access provided by the data-center communications server 325.

Figure 4:
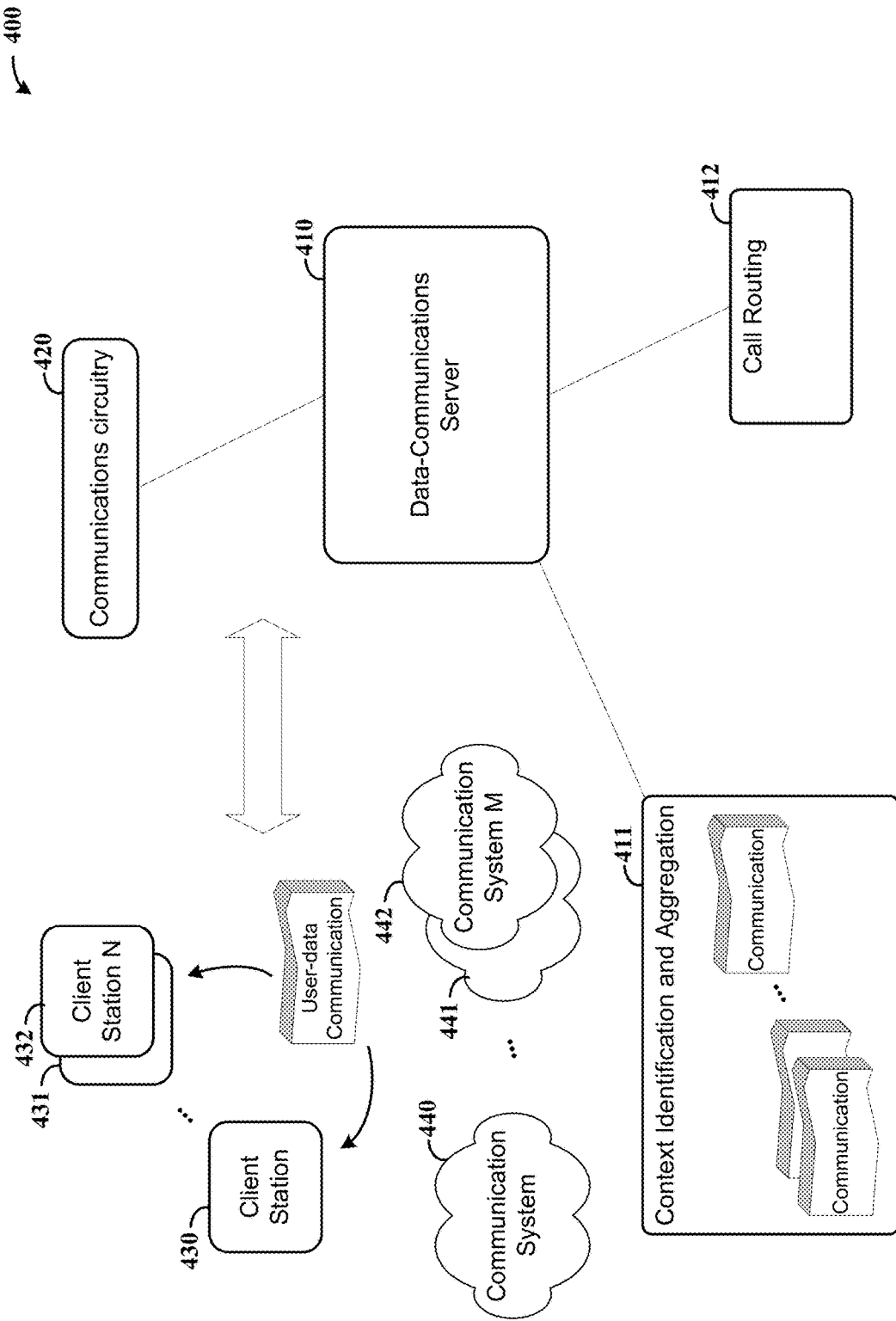
FIG. 4 shows an apparatus for assessing and facilitating communications, consistent with the present disclosure.

FIG. 4 shows an apparatus for assessing and facilitating communications, as may be implemented in accordance with one or more embodiments. The apparatus 400 includes a data-communications server 410 and communications circuitry 420 that provides communication with client stations, including stations 430, 431 and 432 (or "N" number of such stations). Each station may be associated with a particular client entity, such as for individuals making calls/connections and/or clients serving such calls/connections (e.g., for providing customer service). In some implementations, the client stations 430-432 communicate over two or more communication systems 440, 441 and 442 (or "M" number of such systems), such as cellular, VoIP and other systems, as may be utilized for different communication sessions and/or in transitioning between respective systems during a single communication session.

The data-communications server 410 includes a context identification and aggregation module 411, and a call routing module 412. The context identification and aggregation module 411 may identify context data for each user-data-communication with one of the client stations, including identifying data indicative of at least one communications-specific characteristic associated with the user-data-communication. The context identification and aggregation module may aggregate the identified context data for the one of the client stations 430-432, such as by aggregating context data for one or more communications sessions involving the client station, which may occur within one or more of the communication systems 440-442. The call routing module 412 may apply call routing based on the aggregated context data, by routing communications from the one of the client stations to another one of the client stations.

The following embodiments may be implemented with one or more of the figures, such as with the blocks/modules depicted in FIG. 4, involving apparatus(es) and/or methods relating to the indicated functionality. Context data may be identified using one or more of a variety of approaches. In certain embodiments, identifying a context may include identifying one or both of a sentiment and criticality/importance for the data communications. For instance, a sentiment may be identified for each user-data communication among a plurality of data-communications, and used identify the context data. Criticality characteristics may be indicative of an importance of the user-data communication relative to other user-data communications (or of particular users relative to other users, for which the communications are made). Sentiment characteristics may be indicative of a sentiment of a communication exchange with the one of the client stations. In some embodiments, word meaning is identified for voice communications in each user-data-communication. In various applications, critical calls are identified using the identified importance/criticality of a communication, such as for emergency situations or situations in which an issue has reached a threshold of importance/criticality as may relate to an issue being communicated and/or an importance level of an individual making the call. In certain embodiments, embeddings are generated for a plurality of audio clips pertaining to each user-data-communication, and a logistic regression model is trained with the generated embeddings and utilized for identifying the context data. Further, future context data may be predicted for user-data-communication with the one of the client stations, based on context data identified for current or previous user-data-communication with the one of the client stations. Accordingly, communications may be routed based on criticality and/or sentiment characteristics of the user-data communication to be routed and/or of related user-data communications.

In some embodiments, a data-communications server (such as 410) may generate a list of unique representations of each respective one of client entities it serves. The representation may utilize human-readable text to transmit data objects; and build the context data for each user-data-communication based on characteristics selected from the group of: caller priority assigned to the client entity for the one of the client stations, assessed criticality of the context data, assessed sentiment of the context data, background of the client entity for the one of the client stations, and a combination thereof. The data objects may include attribute values/value pairs, array data types, a serializable value, or a combination thereof.

In various embodiments, a data-communications server such as server 410 processes user-data-communication between a set of two or more client stations on disparate data communication systems (e.g., 440-442). The identified context data for each disparate data communications system may be displayed to facilitate assessing the context between the client stations in differing communications platforms.

Certain embodiments are directed to the creation of one or more documents that characterize users, which may utilize communication stations for involvement with related communications (e.g., as depicted in FIG. 4). Such documents may include data useful for identifying a context involving the particular user, and can provide data characterizing historical interactions that can be used for identifying context for a current communication and/or for predicting context. This may relate to system users looking for help or other input, or to agents who serve system users by providing feedback and/or other resources.

Various blocks, modules or other circuits can be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures. Referring to FIG. 4 by way of example, such blocks/modules may include data communications server 410 and its included context identification and configuration and call routing blocks, as well as communications circuitry 420. Each client station 430-432 may include circuitry and, in some aspects, programmed circuitry for interacting with and/or providing functionality of the data-communications server 410.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus that refers to or includes otherwise known circuit-based structures. As a first example, a (data communications) server, station or endpoint device (or endpoint) refers to or includes a communications circuit such as one enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity (aka "client station") refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. As another example, various blocks/modules may implement some or all functionality of other blocks/modules. Such modifications do not depart from the true spirit and scope of various aspects of the disclosure, including aspects set forth in the claims.

What is claimed:

1. A data-communications virtual assistant apparatus, comprising:
   communications circuitry configured to communicate with respective stations including client stations associated with respective client entities; and
   a data-communications server, including circuitry, configured and arranged with the communications circuitry to:
   process user-data-communications between the respective stations, including one of the client stations and another one of the client stations participating in data-communications via the data-communications server;
   identify context data for each user-data-communication with the one of the client stations, the context data including data indicative of at least one communications-specific characteristic associated with the user-data-communication;

aggregate the identified context data for the one of the client stations; and apply call routing based on the aggregated context data, including routing communications from the one of the client stations to another one of the client stations.

2. The apparatus of claim 1, wherein the data-communications server is to identify a sentiment for each user-data communication among a plurality of data-communications, and to identify the context data based on the sentiment.

3. The apparatus of claim 1, wherein the data-communications server is to identify an importance for each respective individual involved in each user-data-communication, and to apply the call routing based on the importance.

4. The apparatus of claim 1, wherein identifying the context data includes identifying word meaning for voice communications.

5. The apparatus of claim 1, wherein identifying the context data includes predicting future context data for user-data-communication with the one of the client stations, based on context data identified for current or previous user-data-communication with the one of the client stations.

6. The apparatus of claim 1, wherein the data-communications server is configured and arranged to route the communications based on criticality and sentiment characteristics of the user-data communication, the criticality characteristics being indicative of an importance of the user-data communication relative to other user-data communications, and the sentiment characteristics being indicative of a sentiment of a communication exchange with the one of the client stations.

7. The apparatus of claim 1, wherein the data-communications server is configured and arranged to:

generate a list of a unique representation of each respective one of the client entities, the representation utilizing human-readable text to transmit data objects; and build the context data for each user-data-communication based on characteristics selected from the group of: caller priority assigned to the client entity for the one of the client stations, assessed criticality of the context data, assessed sentiment of the context data, background of the client entity for the one of the client stations, and a combination thereof.

8. The apparatus of claim 7, wherein the data objects include attribute values/value pairs, array data types, a serializable value, or a combination thereof.

9. The apparatus of claim 1, wherein the data-communications server is configured and arranged to identify critical calls among a plurality of user data-communications based on the identified context data.

10. The apparatus of claim 1, wherein the data-communications server is configured and arranged to identify the context data by:

generating embeddings for a plurality of audio clips pertaining to the user-data-communication; and training a logistic regression model with the generated embeddings.

11. The apparatus of claim 1, wherein the data-communications server is configured and arranged to apply the call routing based on caller identification disambiguation in response to an indication that a caller is not recognized by the data-communications server.

12. The apparatus of claim 1, wherein the data-communications server is configured and arranged to schedule meetings based on the aggregated context data.

13. The apparatus of claim 1, wherein the data-communications server is configured and arranged to provide information for upcoming meetings and communications based on the aggregated context data.

14. The apparatus of claim 1, wherein the data-communications server is configured and arranged to process the user-data-communication between the one of the client stations and the other one of the client stations on disparate data communication systems, and to display the identified context data for each disparate data communications system, therein facilitating assessing of the context between the client stations in differing communications platforms.

15. A method for providing a data-communications virtual assistant, the method comprising:

processing user-data-communications between respective stations including client stations associated with respective client entities, including one of the client stations and another one of the client stations participating in data-communications via a data-communications server;

identifying context data for each user-data-communication with the one of the client stations, the context data including data indicative of at least one communications-specific characteristic associated with the user-data-communication;

aggregating the identified context data for the one of the client stations; and applying call routing based on the aggregated context data, including routing communications from the one of the client stations to another one of the client stations.

16. The method of claim 15, wherein identifying the context data includes identifying word meaning for voice communications in each user-data-communication.

17. The method of claim 15, wherein identifying the context data includes predicting future context data for user-data-communication with the one of the client stations, based on context data identified for current or previous user-data-communication with the one of the client stations.

18. The method of claim 15, wherein identifying the context data includes identifying criticality and sentiment characteristics of the user-data communication, the criticality characteristics being indicative of an importance of the user-data communication relative to other user-data communications, and the sentiment characteristics being indicative of a sentiment of a communication exchange with the one of the client stations.

19. The method of claim 15, wherein identifying the context data includes:

generating embeddings for a plurality of audio clips pertaining to the user-data-communication; and training a logistic regression model with the generated embeddings.

20. The method of claim 15, wherein processing the user-data-communications includes processing communications between the one of the client stations and the other one of the client stations on disparate data communication systems, further including assessing the context between the client stations in differing communications platforms by displaying the identified context data for each disparate data communications system.

* * * * *